July 3, 1928.
A. E. BRONSON
RIM NUT
Filed Dec. 31, 1924
1,675,597
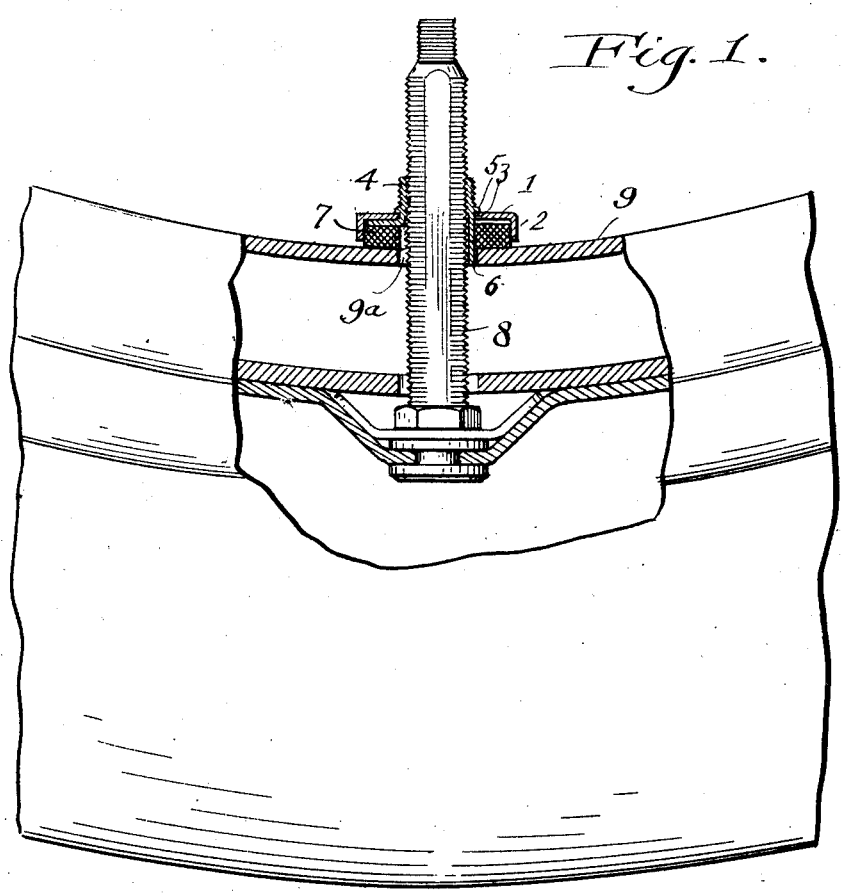
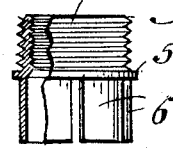
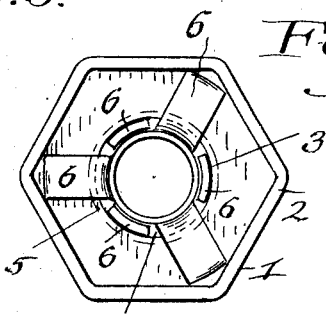
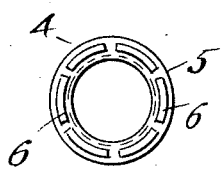
Inventor
Adelbert E. Bronson
By Thurston Kwis & Hudson
Attorneys Patented July 3, 1928.

1,675,597

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

RIM NUT.

Application filed December 31, 1924. Serial No. 758,983.

This invention relates to a rim nut for use in connection with valve stems of automobile tires, and is particularly directed toward a rim nut especially designed for use with balloon tires, where the air pressure within the tube is not sufficient to maintain the valve stem and keep it from being twisted in the opening through the felly of the wheel through which it extends. The rim nut is also so constructed that it may receive the end of a dust cap through a short threaded length, thus obviating the necessity of turning the dust cap the entire length of the valve stem, as is usual in constructions of this kind.

Reference should be had to the accompanying drawings forming a part of this specification, in which Fig. 1 is an elevation with portions in section, showing a portion of a tire, a rim, a felloe of a wheel with a valve stem extending from the inner tube through suitable openings in the felloe of the wheel, with a rim nut in place upon the valve stem; Fig. 2 is a bottom plan view of the rim nut with the packing washer removed; Fig. 3 is an elevation with portions in section of a part of the rim nut; Fig. 4 is a bottom plan view of the showing in Fig. 3.

The rim nut which forms the subject matter of this invention comprises a cup-shaped member 1 having a flange 2, and the member 1 has a central opening 3 through which there extends a member 4 which member is hollow and threaded upon a portion of the interior surface so that it may engage with the threads of a valve stem. A portion of the exterior surface is also threaded, so that it may receive the threaded end of a dust cap of usual construction, whereby the dust cap may be quickly attached or detached to the rim nut. The member 4 has at approximately the central portion a slight outstanding ridge 5 which is adapted to engage with the outer surface of the member 1 when the member 4 is inserted through the central opening 3 in the member 1, as shown in Fig. 1 of the drawing.

The portion of the member 4 which lies beyond the central rib or ridge 5 is slotted to provide a plurality of depending separated fingers 6, in the present instance six are shown. When the member 4 is inserted through the central opening in the member 1, three of the fingers are bent backward against the under surface of the cup-shaped member 1 into approximately the position which is shown in Fig. 2. When this is done the member 4 is firmly united to member 1, so that the two become an inseparable unit. Certain of the fingers 6, to wit, those which are intermediate the fingers that have been turned back, will extend downwardly and around these downwardly extending fingers, and within the cup-shaped member there is inserted a packing 7 which packing is slightly thicker than the depth of the flange 2 of the nut. The fingers which extend through the opening in the packing member 7 extend beyond the surface of the packing ring, and their function will be presently described.

A rim nut of the character described is inserted upon a valve stem 8, and is turned into contact with the felloe of the wheel, as indicated at 9, the straight fingers which have before been described will extend into and occupy the opening $9^a$ formed in the felloe through which the valve stem 8 may extend. This hole is always larger than the diameter of the valve stem for obvious reasons, and the extending fingers which occupy the opening or hole will just fit in between the valve stem and the periphery of the hole $9^a$.

It will be seen from the construction described that the rim nut engaging the valve stem 8 and having fingers which extend into the hole or opening $9^a$ provides a brace and securing means for the valve stem that will effectively maintain it in position, even though the air pressure behind the valve stem may be comparatively speaking low. In other words, it will prevent the twisting or turning action of the valve stem. At the same time the construction described provides for a quick attaching and detaching of the dust cap for the valve stem.

Having described my invention, I claim:—

1. A rim nut comprising a cup-shaped portion, having a central opening therein, a member provided with fingers extending through the said opening, certain of said fingers being bent outwardly into engagement with the under surface of said cup-shaped portion and substantially into engagement with the inner walls of the latter to prevent relative rotation therebetween, and a packing member surrounding said extending fingers and within the cup-shaped portion.

2. A rim nut comprising a cup-shaped portion having a central opening, a member occupying said opening, said member having portions some of which extend substantially parallel with respect to the axis of said opening and beyond said member, and a packing member occupying the cup-shaped member and surrounding the said portions of the centrally arranged member, said centrally arranged member having a portion extending beyond the cup-shaped member and threaded for the reception of a dust cap.

3. A rim nut comprising a cup-shaped member having a central opening, a member occupying said central opening, said member having a shoulder which engages with a surface of the cup-shaped member and having other portions extending through said opening some of which are bent back into engagement with the under surface and inner walls of the cup-shaped member whereby the two members are secured together, certain of said portions extending axially with respect to the opening, a packing member occupying said cup-shaped portion and surrounding the said extension on the centrally arranged member, said extensions extending beyond the surface of the packing member and said centrally arranged member having an opposite extension which is threaded upon its exterior surface for the reception of the dust cap.

In testimony whereof, I hereunto affix my signature.

ADELBERT E. BRONSON.